United States Patent
Dabaga et al.

(10) Patent No.: US 9,511,870 B2
(45) Date of Patent: Dec. 6, 2016

(54) INDEPENDENTLY CONTROLLED DUAL OUTLET AIRCRAFT PCAIR UNIT

(71) Applicant: Avicorp Middle East FZCO, Jebel Ali-Dubai (AE)

(72) Inventors: Fady Dabaga, Abu Dhabi (AE); Saied Samhat, Royal Oak, MI (US); Thomas E Shepheard, Plantation, FL (US)

(73) Assignee: Avicorp Middle East FZCO, Dubai (AE)

( * ) Notice: Subject to any disclaimer, the term of this patent is extended or adjusted under 35 U.S.C. 154(b) by 52 days.

(21) Appl. No.: 14/208,226

(22) Filed: Mar. 13, 2014

(65) Prior Publication Data
US 2015/0259073 A1    Sep. 17, 2015

(51) Int. Cl.
| | |
|---|---|
| F25D 17/04 | (2006.01) |
| B64D 13/08 | (2006.01) |
| F25D 17/06 | (2006.01) |
| B64F 1/36 | (2006.01) |
| F24F 3/00 | (2006.01) |

(52) U.S. Cl.
CPC .............. *B64D 13/08* (2013.01); *B64F 1/362* (2013.01); *F25D 17/06* (2013.01); *F24F 2003/003* (2013.01)

(58) Field of Classification Search
CPC ..... B64F 1/362; B64F 1/364; F24F 2003/003; B64D 13/08; F25D 17/06
USPC .............................. 454/76, 119, 62, 165, 148
See application file for complete search history.

(56) References Cited

U.S. PATENT DOCUMENTS

| | | | |
|---|---|---|---|
| 3,566,614 A | 3/1971 | Imral | |
| 4,462,460 A * | 7/1984 | Braver | F24F 1/0033 165/207 |
| 4,928,750 A | 5/1990 | Nurczyk | |
| 5,117,648 A * | 6/1992 | Kowalski | F25B 1/08 62/238.6 |

(Continued)

FOREIGN PATENT DOCUMENTS

| | | |
|---|---|---|
| CN | 2646052 Y | 10/2004 |
| CN | 200320114412.5 | 10/2004 |

(Continued)

*Primary Examiner* — Len Tran
*Assistant Examiner* — Ana Vazquez
(74) *Attorney, Agent, or Firm* — Moore, Ingram, Johnson & Steele LLP

(57) ABSTRACT

An apparatus for providing preconditioned air to at least one aircraft parked on the ground wherein internal heat exchangers lower or raise the discharge air temperature. The apparatus uses a main housing unit having a vent for air intake, a primary refrigeration system using a primary intake coil to precool or preheat the air in a primary intake plenum serving two blower intakes and two separate and independent blowers. Each blower discharge is then directed to a separate secondary plenum. Each secondary plenum uses a secondary refrigeration system to remove heat resulting from the blower and may further use a tertiary refrigeration system located downstream of the secondary system to provide further cooling or heating to achieve the desired air temperature. Each secondary plenum has an outlet for connection to parked aircraft. The apparatus can provide independent temperature, air pressure and airflow to two or more aircraft or provide appropriate temperature, air pressure and airflow to one aircraft.

4 Claims, 3 Drawing Sheets

(56) References Cited

U.S. PATENT DOCUMENTS

| | | | |
|---|---|---|---|
| 5,205,130 A * | 4/1993 | Pannell | B60H 1/00364 |
| | | | 62/134 |
| 5,715,701 A | 2/1998 | Kreymer | |
| 5,775,125 A | 7/1998 | Sakai et al. | |
| 6,443,393 B1 | 9/2002 | Ooi et al. | |
| 8,051,671 B2 * | 11/2011 | Vinson | H05K 7/20745 |
| | | | 62/259.2 |
| 8,608,106 B2 | 12/2013 | Baumgardt et al. | |
| 2011/0863998 | 4/2009 | Meier et al. | |
| 2012/0042685 A1 | 2/2012 | Dahl | |

FOREIGN PATENT DOCUMENTS

| | | |
|---|---|---|
| JP | 10122607 | 5/1998 |
| WO | 2010106510 | 9/2010 |

* cited by examiner

INDEPENDENTLY CONTROLLED DUAL OUTLET AIRCRAFT PCAIR UNIT

FIELD OF THE INVENTION

The present invention relates to an independently controlled dual outlet air conditioning unit for ground based aircraft that is designed to address the needs of one or two aircraft.

BACKGROUND OF THE INVENTION

An aircraft parked at a gate while on the ground generally requires an auxiliary power unit engine (APU) to cool or heat the aircraft, since the engines of the aircraft are not running. Several Aircraft High Pressure, Low Temperature, Ground Based Air-Conditioners or preconditioned air units (PCAir) have been proposed in the art and used in airports throughout the world. Historically, one airport gate served one aircraft at a time. Therefore, PCAir units were designed to service one aircraft at a time.

However, the rise on use of the larger wide-body aircraft has led to the development of the multiple aircraft ramp system (MARS) gate arrangement wherein two passenger loading bridge can accommodate two narrow body aircraft or one wide body aircraft. Due to the fact that the current PCAir units are designed to serve only one aircraft at a time, when two narrow body aircraft reside at the same aircraft stand position, each aircraft is serviced with the same airflow, air pressure, and temperature regardless of the type of plane or internal temperature in each aircraft. The result is under-cooled or over-cooled aircraft. Moreover, aircraft from different manufacturers have vastly different pressure and temperature requirements. By way of example, Boeing aircraft accept high air flow at 32° F., but several Airbus aircraft require air at −10° F. at very low air flow to prevent damage to the air ducts.

Moreover, aircraft from different manufacturers have vastly different pressure and temperature requirements. By way of example, Boeing aircraft accept high air flow at 32° F., but several Airbus aircraft require air at −10° F. at very low air flow to prevent the air ducts from bursting.

The use of two PCAir units to supply one aircraft is also known in the art and commonly used by airports throughout the world. U.S. patent application Ser. No. 13/257,461 provides for a PCAir unit that contains two independent air units. Each unit can be independently set for temperature because they are two separate units. However, the PCAir unit has only one single intake airstream. Similar PCAir units can be found in U.S. patent application Ser. No. 11/863,998 and a similar mobile unit can be found in CN Pat. No. 200320114412.5.

A more desirable PCAir unit would allow for independent temperature, air pressure and airflow control of each narrow body aircraft at a MARs gate. Such a PCAir unit would allow independent control of each of two or more PCAir outlets from a single unit. The desired PCAir unit system would provide independent temperature, air pressure and airflow to each narrow body aircraft in a MARs configuration, or provide appropriate temperature, air pressure and airflow to one wide body aircraft.

SUMMARY OF THE INVENTION

The present invention relates to a single preconditioned air (PCAir) unit for supplying preconditioned air to aircraft parked on the ground, preferably at a passenger loading bridge or gate. The single PCAir unit of the present invention has at least two outlets that are independent of each other. In a preferred embodiment the single PCAir unit of the present invention comprises a main housing unit comprising a vent for air intake, a primary refrigeration system, consisting of a primary intake coil, to precool or preheat the air in a primary air intake plenum serving two blower intakes, two blowers, and two separate secondary plenums each attached to a single blower. Each secondary plenum of the present invention contains a secondary refrigeration system to remove heat resulting from the blower and may comprise an additional tertiary refrigeration system located downstream of the secondary system to provide further cooling or heating to achieve the desired air temperature, and an outlet for connection to parked aircraft. The tertiary refrigeration system of the present invention comprises either one singular coil or a first-stage coil and a second-stage coil. It is understood that the term refrigeration system used herein includes systems that lower or raise the temperature of the air within the system.

In a preferred embodiment of the present invention the primary refrigeration system is located in the primary air intake plenum is a chilled water coil. It is understood that alternative coils, such as Direct Expansion or a coil using an ethylene glycol and water mixture, hereinafter EGW coil or ethylene glycol water coil, may be used for the primary refrigeration system.

The two blowers of the present invention provide air to the separate secondary plenums. Each blower utilizes a separate variable-frequency drive which allows for air pressure and volume to be individually adjusted in each secondary plenum. It is understood that any adjustable-speed drive may be utilized by the blowers of the present invention. Alternatively, any number of blower and plenum configurations may be used to achieve the desired number of outputs.

Each set of refrigeration systems within each individual plenum of the present invention is independently controlled allowing for independent temperature and defrost control for each refrigeration system. In one embodiment of the present invention, the use of a chilled water coil for each secondary refrigeration system and the use of a downstream tertiary refrigeration system allows for sub-freezing temperatures down to −18° C. (−0.4° F.) or as high as 70° C. (158° F.) from each secondary plenum outlet, independent of the other secondary plenum. By way of example, one outlet of the present invention may be cooling a narrow body aircraft to −18° C. (−0.4° F.) while the other outlet, of the same unit, may be used to heat a different narrow body aircraft up to 70° C. (158° F.) simultaneously. Alternatively, the secondary refrigeration system and tertiary refrigeration system in each secondary plenum may be set for the same temperature to service one wide body aircraft. It is understood that the defrost cycles will adhere to the requirements of the aircraft manufacturer and/or International Air Transport Association's Airport Handling Manual.

In a preferred embodiment of the present invention, the secondary refrigeration system in each secondary plenum is a chilled water coil. The tertiary refrigeration system of each secondary plenum may be a singular coil, such as an EGW coil or consist of a first-stage coil and a second-stage coil wherein the first-stage and second-stage coil are Direct Expansion coils. Alternatively, all of the refrigeration systems within the secondary plenums may be of any type of system and the series of the systems may be in any arrangement.

It will be understood that when Direct Expansion coils are utilized, a compressor and condenser/heat exchanger circuit is necessary to support each Direct Expansion coil. By way of example, wherein the single PCAir unit of the present invention utilizes Direct Expansion coils for the first-stage and second-stage coils in the secondary plenum, the PCAir unit contains four scroll compressors with four circuits, two circuits on each side of the main housing unit. It is understood that any number of compressors may be utilized and the number is dependent upon the number of Direct Expansion coils utilized within the PCAir unit. It is also understood that more traditional rotary, reciprocating, and wobble-plate compressors may be used in place of scroll compressors. The compressors of the present invention may be powered by a variable-frequency drive or a plurality of variable frequency drives. However, any adjustable-speed drive may be used to power the compressors. It is further understood that each compressor requires a condenser. In a preferred embodiment of the present invention, each condenser is a water-cooled condenser/heat exchanger. The water-cooled condenser/heat exchanger may be shell and tube design or plate and fin design. It is understood that alternative condensers/heat exchangers, such as a cupronickel shell-and-tube heat exchanger may be used in the PCAir unit of the present invention.

In a preferred embodiment of the present invention, a cabin temperature sensor will allow for each secondary plenum to provide separate cabin temperature control. The sensor, in contact with the PCAir unit of the present invention, may be located within the passenger loading bridge or any other location deemed appropriate for accurate cabin temperature control. The cabin sensor is connected to a central control unit that is configured to activate the primary, secondary, and tertiary coils as well as all of the blowers independently.

In another embodiment, the single PCAir unit of the present invention may be attached or connected to the passenger loading bridge, it may be installed in an underground configuration for use with the passenger loading bridge, or it may be mobile to attend to parked aircraft that are not at a passenger loading bridge location.

Other aspects, features, and advantages will become apparent to those skilled in the art from the detailed description and accompanying drawings. It should be understood, however, that the detailed description and accompanying drawings, while indicating preferred embodiments of the present invention, are given by way of illustration and not limitation.

DETAILED DESCRIPTION OF THE INVENTION

Figure 1:
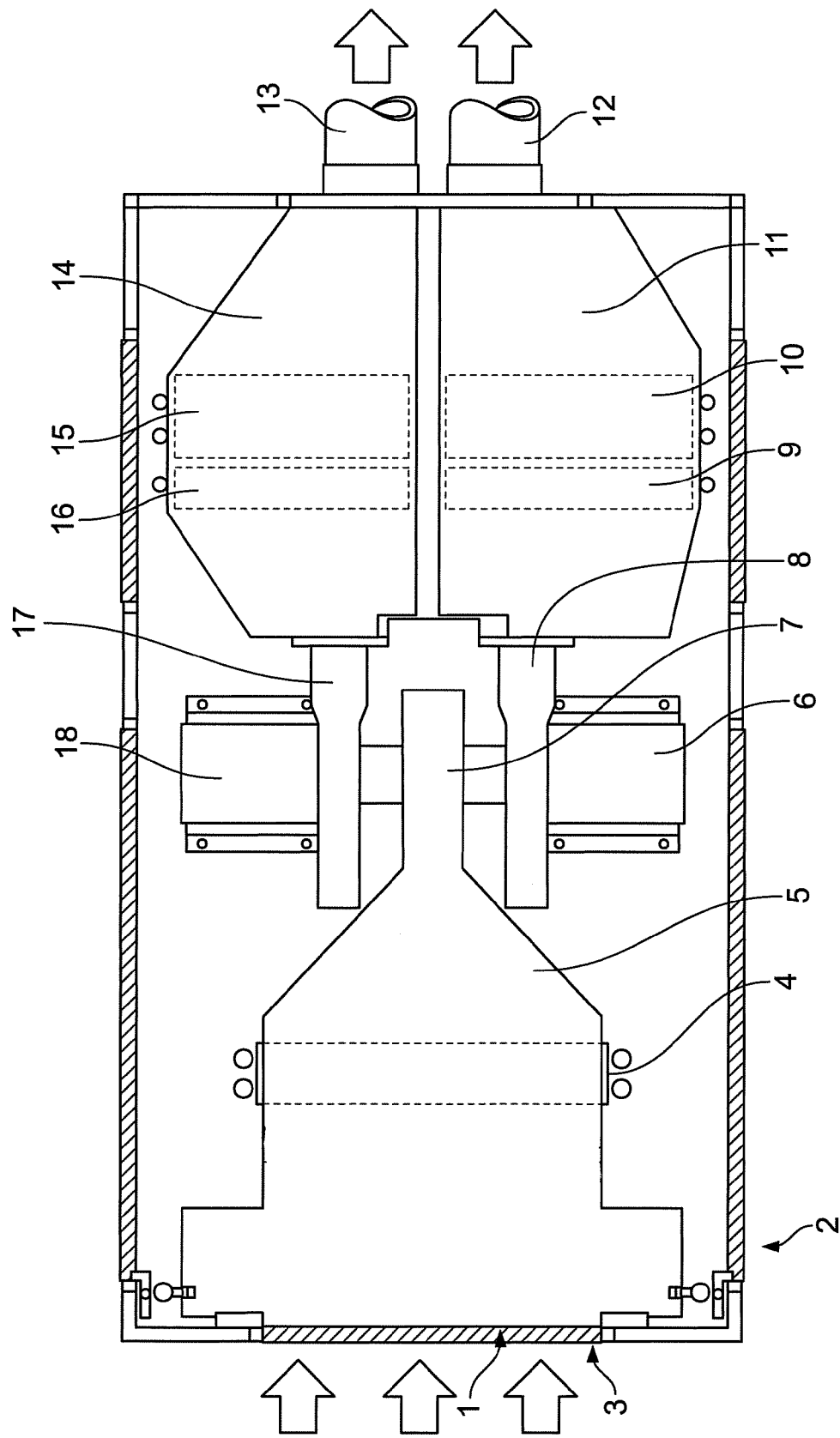
FIG. 1 is cross-sectional schematic view of the dual blower configuration and primary, secondary and tertiary refrigeration system configuration of the PCAir unit of the present invention.

FIG. 1 is a cross-sectional schematic view of the PCAir unit of the present invention. The PCAir unit consists of a frame 2. Located within frame 2 is an air inlet 3. A primary air intake plenum 5 is located between air intake 3 and blower intake 7. A primary intake coil 4 extends across a cross-section of primary air intake plenum 5 so that air passing from the air inlet 3 to the blower intake 7 must pass through the primary intake coil 4. An air filter 1 extends across primary air intake plenum 5 between the air inlet 3 and the primary intake coil 4.

Blower intake 7 is connected to blowers 8 and 17. Blower 8 is controlled by blower motor 6 and blower 17 is controlled by blower motor 18. Blower 8 is connected with secondary plenum 11 and blower 17 is connected with secondary plenum 14.

Airflow is achieved by drawing outside air through the air inlet 3, through the air filter 1, and then into the primary air intake plenum 5. The airflow then passes through primary intake coil 4 to blower intake 7. The airflow then passes through blowers 8 and 17 and into secondary plenums 11 and 14.

A secondary refrigeration system 9 and a tertiary refrigeration system 10 extend across secondary plenum 11 so that air from blower 8 must pass through the secondary refrigeration system 9 and then pass through tertiary refrigeration system 10. Air outlet 12 is connected to secondary plenum 11. Airflow in secondary plenum 11 passes through secondary refrigeration system 9 and tertiary refrigeration system 10 prior to discharge through air outlet 12.

A secondary refrigeration system 16 and a tertiary refrigeration system 15 extend across secondary plenum 14 so that air from blower 17 must pass through secondary refrigeration system 16 and then pass through tertiary refrigeration system 15. Air outlet 13 is connected to secondary plenum 14. Airflow in secondary plenum 14 passes through secondary refrigeration system 16 and tertiary refrigeration system 15 prior to discharge through air outlet 13.

Figure 2:
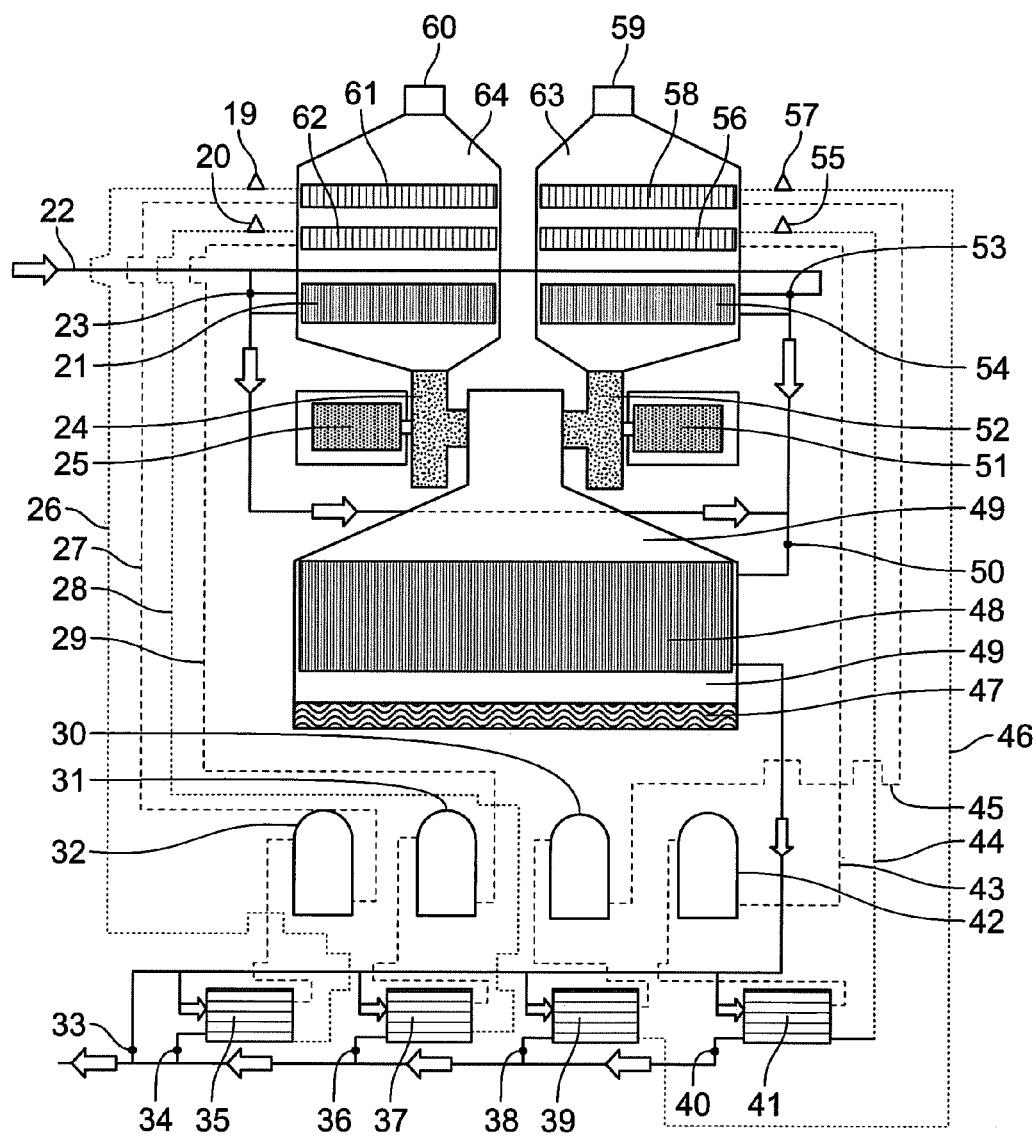
FIG. 2 is a schematic view of a preferred embodiment of the present invention wherein the primary and secondary refrigeration systems consist of chilled water coils and the tertiary refrigeration system in each secondary plenum consists of a first-stage Direct Expansion coil and a second-stage Direct Expansion coil.

FIG. 2 is a schematic of the PCAir unit of the present invention wherein the primary and secondary refrigeration systems consist of chilled water coils and the tertiary refrigeration system consists of a first-stage Direct Expansion coil and a second-stage Direct Expansion coil within each secondary plenum. An intake air filter 47 and a primary chilled water coil 48 extend across primary intake air plenum 49 so that air must pass through the intake air filter 47 and then through the primary chilled water coil 48. The primary intake air plenum 49 is connected to blower 24 and blower 52. Blower 24 is controlled by blower motor 25 and blower 52 is controlled by blower motor 51. Blower 52 is connected to secondary plenum 63 and blower 24 is connected to secondary plenum 64.

Airflow is achieved by drawing outside air through air filter 47 and then into the primary air intake plenum 49. The airflow then passes through primary chilled water coil 48 to blowers 24 and 52. The airflow then passes through blowers 24 and 52 and into secondary plenums 64 and 63.

Secondary chilled water coil 54, first-stage Direct Expansion coil 56 and second-stage Direct Expansion coil 58 extend across secondary plenum 63. Air outlet 59 is connected to secondary plenum 63. Airflow in secondary plenum 63 passes first through secondary chilled water coil 54, then through first-stage Direct Expansion coil 56, then through second-stage Direct Expansion coil 58 prior to discharge through air outlet 59.

First-stage Direct Expansion coil 56 is in fluid connection with compressor 42 via suction line 43. Compressor 42 is in fluid connection with water condenser 41, which is in fluid connection with expansion valve 55 via discharge line 44. Expansion valve 55 is in fluid connection with first-stage Direct Expansion coil 56. Second-stage Direct Expansion coil 58 is in fluid connection with compressor 30 via suction line 45. Compressor 30 is in fluid connection with water condenser 39, which is in fluid connection with expansion valve 57 via discharge line 46. Expansion vale 57 is in fluid connection with second-stage Direct Expansion coil 58.

Secondary chilled water coil 21, first-stage Direct Expansion coil 62 and second-stage Direct Expansion coil 61 extend across secondary plenum 64. Air outlet 60 is connected to secondary plenum 64. Airflow in secondary plenum 64 passes through secondary chilled water coil 21, then through first-stage Direct Expansion coil 62, then through second-stage Direct Expansion coil 61 prior to discharge through air outlet 60.

First-stage Direct Expansion coil 62 is in fluid connection with compressor 31 via suction line 29. Compressor 31 is in fluid connection with water condenser 37, which is in fluid connection with expansion valve 20 via discharge line 28. Expansion vale 20 is in fluid connection with first-stage Direct Expansion coil 62. Second-stage Direct Expansion coil 61 is in fluid connection with compressor 32 via suction line 27. Compressor 32 is in fluid connection with water condenser 35, which is in fluid connection with expansion valve 19 via discharge line 26. Expansion valve 19 is in fluid connection with second-stage Direct Expansion coil 61.

Chilled water enters the system via the chilled water entry 22. The chilled water flows to three-way valves 23 and 53. The three-way valves either direct the chilled water to secondary chilled water coils 21 and 54 or bypass secondary coils 21 and 54 depending upon the desired discharge air temperature. Once the chilled water flows through secondary chilled water coils 21 and 54, or bypasses secondary chilled water coils 21 and 54, it flows to two-way valve 50. From two-way valve 50 the chilled water flows through primary chilled water coil 48. Upon exiting primary chilled water coil 48 the chilled water is then directed to water condensers 35, 37, 39 and 41. Two-way valves 34, 36, 38 and 40 maintain proper refrigerant discharge pressure for water condensers 35, 37, 39 and 41 respectively. Two-way valve 33 allows for chilled water bypass, which enables constant chilled water flow throughout the system. The chilled water is then returned to the system.

Figure 3:
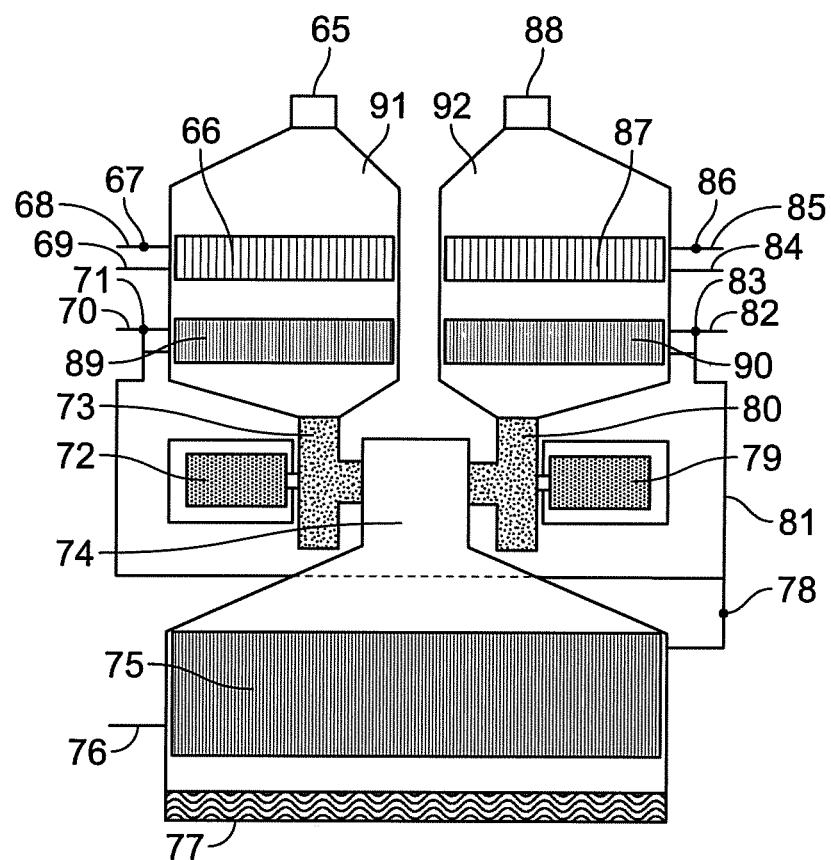
FIG. 3 is a schematic view of a preferred embodiment of the present invention wherein the primary and secondary refrigeration systems consist of chilled water coils and the tertiary refrigeration system in each secondary plenum consists of an EGW coil.

FIG. 3 is a schematic view of a preferred embodiment of the PCAir unit of the present invention wherein the primary and secondary refrigeration systems consist of chilled water coils and the tertiary refrigeration system in each secondary plenum consists of an EGW coil. Intake air filter 77 and primary chilled water coil 75 each extend across primary intake air plenum 74 so that air must pass through the intake air filter 77 and then through the primary chilled water coil 75. The primary intake air plenum 74 is connected to blower 73 and blower 80. Blower 73 is controlled by blower motor 72 and blower 80 is controlled by blower motor 79. Blower 73 is connected to secondary plenum 91 and blower 80 is connected to secondary plenum 92.

Airflow is achieved by drawing outside air through intake air filter 77, and then into the primary air intake plenum 74. The airflow then passes through primary chilled water coil 75, through blowers 73 and 80 and into secondary plenums 91 and 92.

Secondary chilled water coil 89 and EGW coil 66 extend across secondary plenum 91. Air outlet 65 is connected to secondary plenum 91. Airflow in secondary plenum 91 passes through secondary chilled water coil 89 and EGW coil 66 prior to discharge through air outlet 65.

Secondary chilled water coil 90 and EGW coil 87 extend across secondary plenum 92. Air outlet 88 is connected to secondary plenum 92. Airflow in secondary plenum 92 passes through secondary chilled water coil 90 and EGW coil 87 prior to discharge through air outlet 88.

Chilled water enters the system via chilled water entry 70 and chilled water entry 82. The chilled water from chilled water entry 70 flows to three-way valve 71. Three-way valve 71 either directs the chilled water to secondary chilled water coil 89 or to bypass secondary coil 89 depending upon the desired discharge air temperature. The chilled water then flows to two-way valve 78. The chilled water from chilled water entry 82 flows to three-way valve 83. Three-way valve 83 directs the chilled water to secondary chilled water coil 90 or to bypass secondary chilled water coil 90 depending upon the desired discharge air temperature. The chilled water then flows to two-way valve 78 via chilled water supply line 81. Chilled water supply line 81 may be used to supply chilled water to primary chilled water coil 75 while bypassing secondary chilled water coils 89 and 90. From two-way control valve 78 the chilled water flows through primary chilled water coil 75. The chilled water is then returned to the system through chilled water return 76.

EGW enters secondary plenum 91 via EGW supply 68. Two-way valve 67 controls the flow of EGW to EGW coil 66. The EGW then enters EGW coil 66 and is cooled below the freezing point of water. The EGW then exits EGW coil 66 and is returned to the system via EGW return 69.

EGW enters secondary plenum 92 via EGW supply 85. Two-way valve 86 controls the flow of EGW to EGW coil 87. The EGW then enters EGW coil 87 and is cooled below the freezing point of water. The EGW then exits EGW coil 87 and is returned to the system via EGW return 84.

What is claimed is:

1. An apparatus for supplying preconditioned air to at least one parked aircraft, comprising a main unit housing comprising;
   a primary plenum comprising an inlet for air ambient and a primary refrigeration system a means for activating the primary refrigeration system,
   a plurality of blowers each consisting of an inlet and an outlet, wherein the primary plenum is connected to the inlet of each blower,
   a means for activating each blower independently,
   a plurality of secondary plenums, wherein each secondary plenum is connected to the outlet of one of the plurality of blowers such that each of the plurality of blowers is connected to a separate secondary plenum, and each secondary plenum further comprising;
   a secondary refrigeration system positioned adjacent to the blower,
   a means for activating the secondary refrigeration system,
   a tertiary refrigeration system positioned downstream from the secondary refrigeration system,
   a means for activating the tertiary refrigeration system, wherein each of the tertiary refrigeration systems further comprises;
   a first-stage Direct Expansion coil, comprising;
   a compressor,
   a means to activate the compressor,
   a condenser, and
   an expansion valve, a second-stage Direct Expansion coil positioned downstream from the first-stage Direct Expansion coil, comprising;
a compressor,
a means to activate the compressor,
a condenser, and
an expansion valve, and
an air outlet.

2. The apparatus of claim 1 wherein the plurality of blowers consists of two blowers and the plurality of secondary plenums consists of two secondary plenums.

3. An apparatus for supplying preconditioned air to at least one parked aircraft, comprising a main unit housing comprising;
a primary plenum comprising an inlet for air ambient air and a primary refrigeration system, wherein the primary refrigeration system is a chilled water coil,
a means for activating the primary refrigeration system,
a plurality of blowers each consisting of an inlet and an outlet, wherein the primary plenum is connected to the inlet of each blower,
a means for activating each blower independently,
a plurality of secondary plenums, wherein each secondary plenum is connected to the outlet of one of the plurality of blowers such that each of the plurality of blowers is connected to a separate secondary plenum, and each secondary plenum further comprising;
a secondary refrigeration system positioned adjacent to the blower, wherein the secondary refrigeration system is a chilled water coil,
a means for activating the secondary refrigeration system,
a tertiary refrigeration system positioned downstream from the secondary refrigeration system,
a means for activating the tertiary refrigeration system, and
an air outlet,
wherein the tertiary refrigeration system further comprises;
a first-stage Direct Expansion coil, comprising;
a compressor,
a means to activate the compressor,
a condenser, and
an expansion valve,
a second-stage Direct Expansion coil positioned downstream from the first-stage Direct Expansion coil, comprising;
a compressor,
a means to activate the compressor,
a condenser, and
an expansion valve.

4. The apparatus of claim 3 wherein the plurality of blowers consists of two blowers and the plurality of secondary plenums consists of two secondary plenums.

* * * * *